United States Patent [19]

Copland

[11] 3,743,768

[45] July 3, 1973

[54] METHOD AND APPARATUS FOR ELECTRONICALLY MONITORING A FIELD OF VIEW

[75] Inventor: George V. Copland, Duncan, Okla.

[73] Assignee: Halliburton Company, Duncan, Okla.

[22] Filed: Apr. 2, 1971

[21] Appl. No.: 130,643

[52] U.S. Cl. ...... 178/6.8, 178/DIG. 33, 178/DIG. 38

[51] Int. Cl. .......................... H04n 5/14, H04n 7/18

[58] Field of Search .............. 178/DIG. 33, DIG. 38, 178/6.8, DIG. 37; 250/219 DF; 340/146.3 Y, 146.3 ED, 146.3 SY

[56] References Cited

UNITED STATES PATENTS

| | | | |
|---|---|---|---|
| 3,585,588 | 6/1971 | Hardin et al. | 340/146.3 ED |
| 3,381,274 | 4/1968 | Quade et al. | 340/146.3 Y |
| 3,049,588 | 8/1962 | Barnett | 178/DIG. 1 |
| 3,160,741 | 12/1964 | Gottschall et al. | 250/219 DF X |
| 3,578,904 | 5/1971 | Dewey et al. | 178/DIG. 6 |

*Primary Examiner*—Howard W. Britton
*Attorney*—Burns, Doane, Swecker & Matthis

[57] ABSTRACT

A method and apparatus for electronically monitoring a field of view and manifesting significant optical changes occurring therein to detect unauthorized intrusion into an area defined by the field of view. The number of times that the amplitude of successive electronic signatures of the field of view exceeds a predetermined threshold is counted for two different electronic signatures. The two numbers counted are compared and if the numerical difference therebetween exceeds a selected number, an alarm indication is provided.

16 Claims, 4 Drawing Figures

INVENTOR
GEORGE V. COPLAND

BY Burns, Doane, Swecker & Mathis

ATTORNEYS

METHOD AND APPARATUS FOR ELECTRONICALLY MONITORING A FIELD OF VIEW

BACKGROUND OF THE INVENTION

The present invention relates to a method and apparatus for electronically monitoring a predetermined field of view, and more specifically to a method and apparatus for manifesting significant optical changes occurring within a predetermined field of view to thereby detect unauthorized intrusion into an area defined by the field of view.

A number of video systems for detecting unauthorized intrusion have been developed over the years. These systems range from systems using very simple photoelectric devices such as photocells to systems utilizing more complex photoelectric devices such as television camera or pickup tubes. The television camera tube may be an image orthicon tube, a vidicon tube or other tubes capable of scanning an optical image of a field of view determined by the camera lens system and converting the optical image into an electronic signature of the field of view.

These systems are usually quite expensive and complex due to the nature of the circuitry required for electronic signature comparison. For example, in one prior art system, a live frame from a television camera is compared line-by-line with a stored frame to detect scene changes. This type of comparison, of course, requires accurate high frequency synchronization, a large amount of memory space for signal storage, and may give erroneous results when natural scene changes occur due to changes in shadow length and wind induced movements.

It is therefore an object of the present invention to obviate these and other problems associated with the prior art surveillance systems.

It is a further object of the present invention to provide a novel method and apparatus for indicating significant optical changes which occur within a field of view.

It is another object of the present invention to provide a novel method and alarm apparatus for distinguishing between significant optical changes occurring within a field of view and gradual optical changes due to natural occurrences.

It is still another object of the present invention to provide a novel method and apparatus for intruder monitoring of an area with limited digital data storage.

It is yet another object of the present invention to provide a novel method and apparatus for monitoring a predetermined field of view by counting the number of significant differences in signal strength between two different electronic signatures of the field of view.

These and other objects and advantages of the present invention will become apparent to one skilled in the art to which the invention pertains from a perusal of the following detailed description when read in conjunction with the appended drawings.

THE DRAWINGS

DETAILED DESCRIPTION

Figure 1:
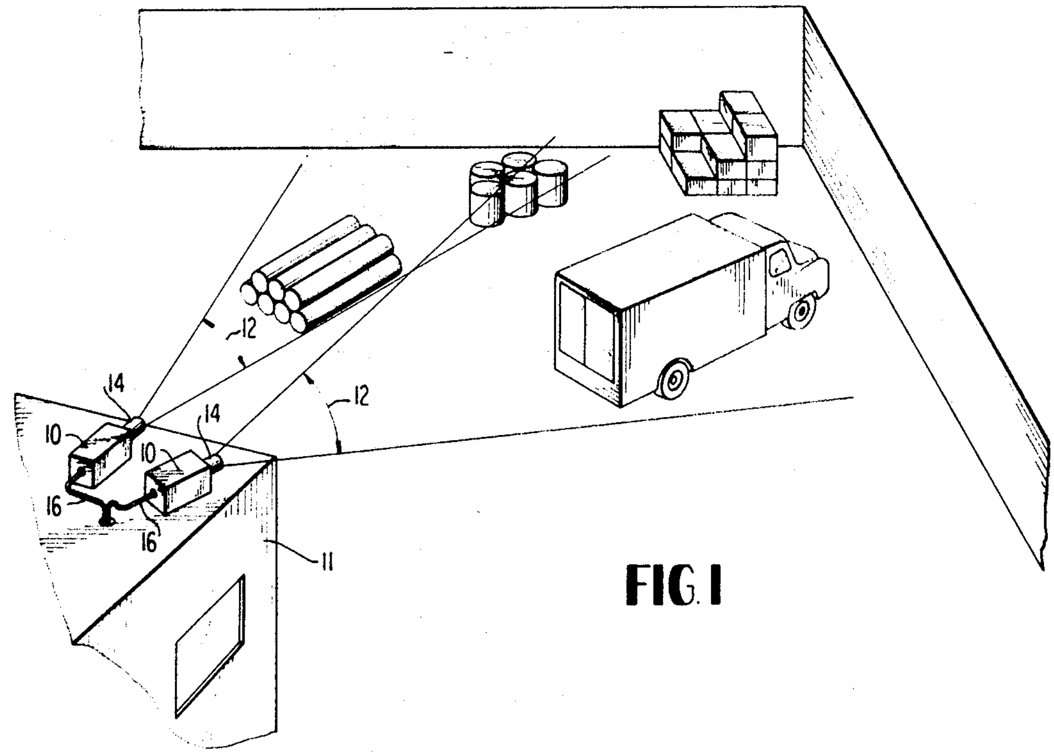
FIG. 1 is a pictorial view of the system of the present invention as utilized for the surveillance of a security area.

The system of the present invention as utilized to detect unauthorized intrusion into an area such as a fenced yard where supplies are stored is illustrated in FIG. 1.

One or more scanning devices 10, for example commercially available television cameras, are mounted in an advantageous position such as on a building 11 and are directed toward the area to be monitored. The scanning devices 10 electronically scan the optical image of the area or scene under surveillance within the field of view 12 as determined by the optics 14 utilized therewith by the scanning pattern thereof, or in any other suitable conventional manner. The fields of view may overlap, as illustrated, where more than one scanning device is needed to monitor the entire area.

The scanning device 10 scans the optical image of the area of the field of view 12 and generates successive electronic signatures of this area at predetermined time intervals. The electronic signatures thus generated are preferably standard commercial television video signals which include both scene or picture illumination information and various synchronization signals as is subsequently described in detail in connection with FIG. 4.

One complete electronic signature of the field of view 12 might include two interlaced fields which together make up one frame or complete picture. One complete picture comprising the two fields is generated approximately every one-thirtieth of a second. These electronic signatures generated by the scanning device 10 successively at 0.0333 second intervals may be transmitted in any suitable conventional manner, e.g. via a cable 16, to a remote monitoring station 18, such as that shown in FIG. 2. The monitoring station 18 may be, for example, a guard station or other security station at a central location where a number of different areas may be simultaneously monitored visually and/or automatically as will hereinafter be described.

Figures 2, 4:
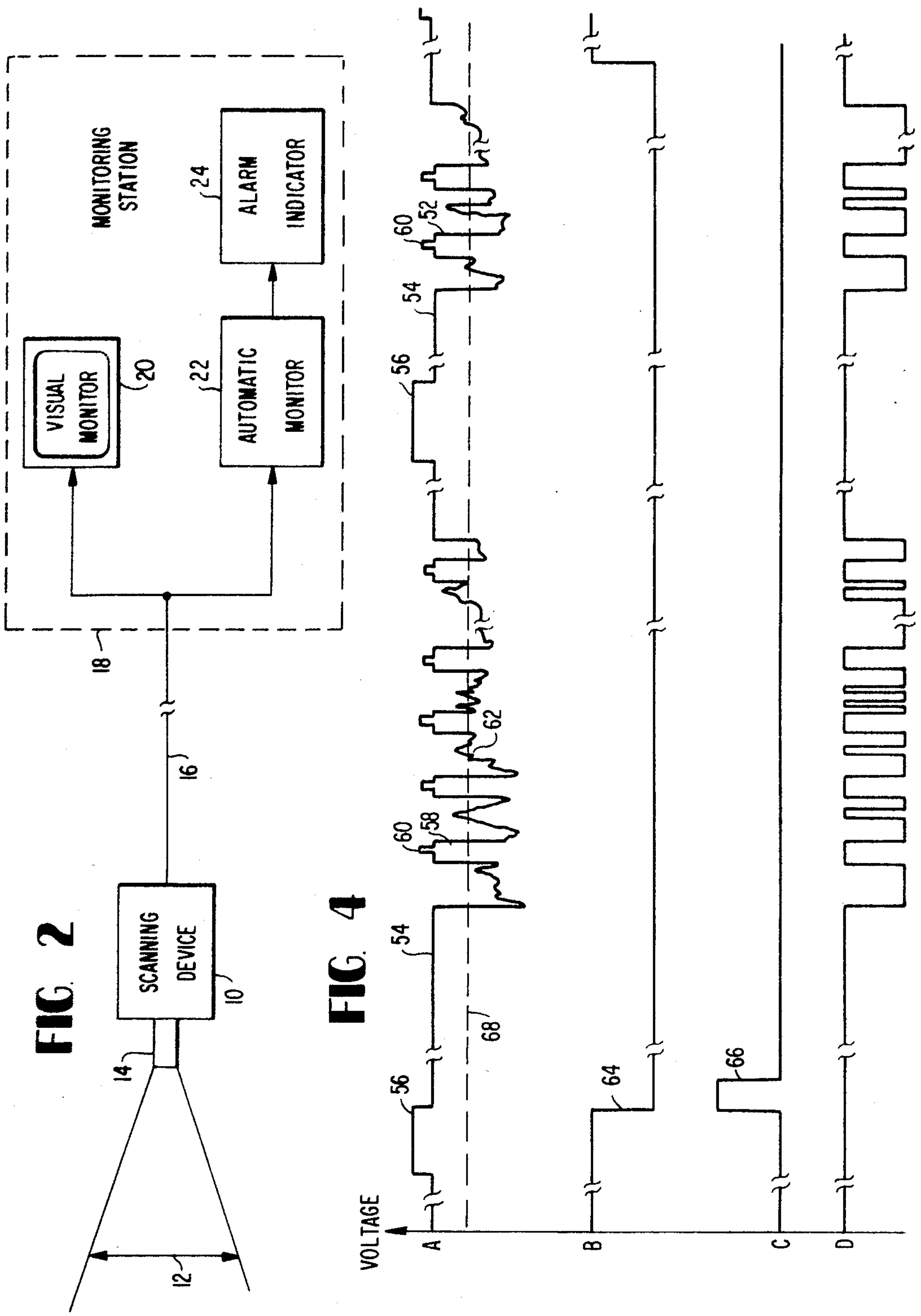
FIG. 2 is a general functional block diagram of the system of the present invention.

Referring now to FIG. 2, the successive electronic signatures provided at the monitoring station 18 may be applied to both a visual monitor 20 and to an automatic monitor 22, hereinafter described in greater detail. The visual monitor 20 is preferably a conventional television monitor which converts the successive electronic signatures into a visual display of the field of view of the scanning device 10, to thereby allow an operator at the monitoring station 18 to visually detect unauthorized intrusion into the area under surveillance.

The automatic monitor 22 automatically detects any intrusion into the area under surveillance. When an unauthorized intrusion is detected by the automatic monitor 22, an alarm signal is generated and an alarm condition is indicated on an alarm indicator 24. The alarm condition may be, for example, a visual or audible alarm capable of alerting security personnel.

Figure 3:
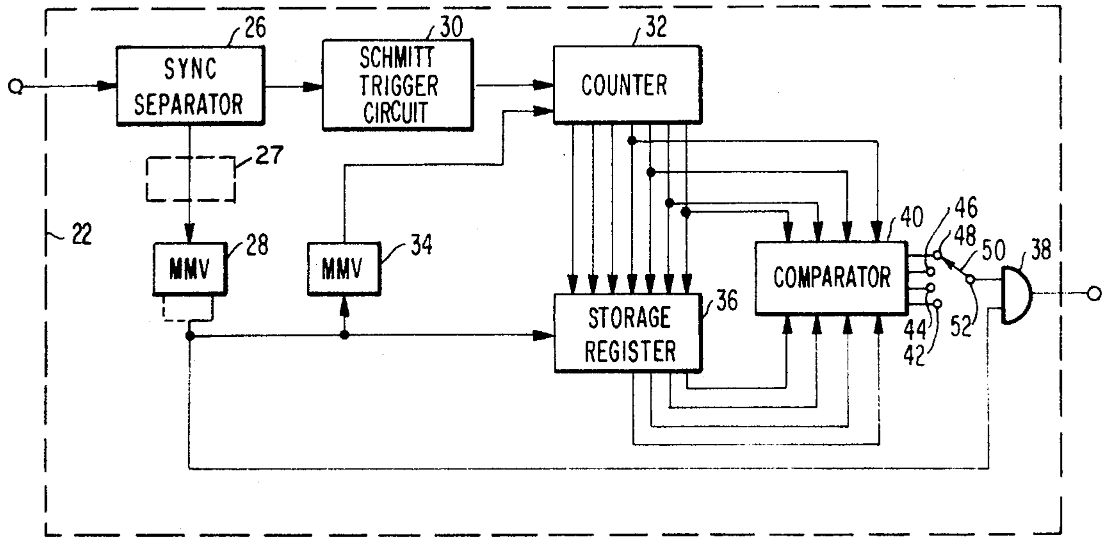
FIG. 3 is a detailed functional block diagram of the monitoring circuit of FIG. 2; and, FIG. 4 is an exemplary graphical representation of an electronic signature of a predetermined field of view and various signals generated by the automatic monitor of FIGS. 2 and 3.

One embodiment of the automatic monitor 22 of FIG. 2 is illustrated in greater detail in FIG. 3 to facilitate an understanding of the present invention. Referring now to FIG. 3, the successive electronic signatures of the scanning device 10 are applied to a sync separator 26 in the automatic monitor 22. The sync separator 26 isolates the vertical synchronization signals from the composite video signals comprising the electronic signatures and the vertical sync signals are applied to a monostable or one shot multivibrator 28.

The composite electronic signatures from the sync separator 26 are applied to a suitable amplitude responsive analog to digital converter such as a Schmitt trigger circuit 30 and the output signal from the Schmitt trigger circuit 30 is applied to the clock input terminal of a suitable conventional binary counter 32 comprising a plurality of serially connected binary elements.

The output signal from the false output terminal of the monostable multivibrator 28 is applied to the trigger input terminal of a second multivibrator 34, to the read or strobe input terminal of a conventional storage register 36, and to one input terminal of a two input terminal AND gate 38. The output signal from the true output terminal of the multivibrator 34 is applied to the reset input terminal of the counter 32 and the output signal from the AND gate 38 is applied to the alarm indicator 24 of FIG. 2.

The output signals taken from the true output terminals of the binary elements of the counter 32 representing the number contained therein are applied to the corresponding binary data input terminals of the storage register 36. In addition, a preselected number of successive binary output signals from the counter 32 and the storage register 36, commencing conveniently with the least significant digit, may be applied to a suitable conventional digital comparator 40 for a numerical comparison of the number in the counter 32 with the number stored in the register 36. The numerical difference between the binary output signals from the counter 32 and the storage register 36 is provided in binary form at a plurality of switch contacts 42–48 of a selector switch 50. The common contact 52 of the selector switch 50 is connected to the second input terminal of the two input terminal AND gate 38.

To facilitate a description of the operation of the present invention, a typical electronic signature of the field of view, i.e. two successive fields which make up one frame or picture, is illustrated in FIG. 4. Referring to FIG. 4, each electronic signature comprises two vertical blanking pulses 54, two vertical sync pulses 56, approximately 525 horizontal blanking and horizontal sync pulses 58 and 60, respectively, and the analog picture information signal 62 intermediate the horizontal blanking pulses 58. The vertical sync pulses 56, although illustrated as single pulses for clarity, are in actuality broken up into six blocks so that horizontal synchronization is maintained during this period. In addition, it should be noted that the equalization pulses and the horizontal sync pulses occurring during the time of the vertical blanking pulses 54 have been omitted for clarity since they are not utilized by the automatic monitor 22.

The composite video or electronic signature of FIG. 4 is applied to the sync separator 26 and the vertical sync pulses 56 are isolated and applied to the multivibrator 28. As is shown in waveform B of FIG. 3, the output signal from the false output terminal of the multivibrator 28 assumes a low signal level when this first vertical sync pulse is applied thereto and remains at this low signal level for the duration of one electronic signature or frame, i.e. for approximately one thirtieth of a second.

Alternatively, a suitable divide-by-two scaler 27, such as a flipflop, may be utilized between the sync separator 26 and the multivibrator 28 as illustrated in phantom in FIG. 3, and the output signal from the true output terminal of the multivibrator 28 utilized to trigger the multivibrator 34 and enable the register 36 and the AND gate 38.

The trailing or negative going edge 64 of the signal from the multivibrator 28 strobes the storage register 36 to transfer the contents of the counter 32 into the register 36. In addition, this negative going edge 64 of the monostable multivibrator 28 output signal sets the monostable multivibrator 34 to provide a positive pulse of short duration at the true output terminal thereof. The signal from the multivibrator 28 also inhibits the AND gate 38 for the period during which the output signal from the multivibrator 28 is at a low signal level. The negative going edge of pulse 66 from the monostable multivibrator 34 resets the counter 32 shortly after the register 36 is loaded, readying the counter 32 for the next electronic signature.

The electronic signature of the field of view is applied to the Schmitt trigger circuit 30 which provides an output signal each time the amplitude of the electronic signature exceeds a predetermined threshold level 68 illustrated in phantom in waveform A of FIG. 4. The resulting output signal from the Schmitt trigger circuit 30, illustrated as waveform D in FIG. 4, is a series of pulses, a pulse of which is generated each time the amplitude of the electronic signature exceeds the threshold 68.

The pulses from the Schmitt trigger circuit 30 as illustrated in waveform D in FIG. 4 are counted by the counter 32 during one electronic signature. At the end of one electronic signature, the signal from the multivibrator 28 transfers the number counted by the counter 32 into the storage register 36 and shortly thereafter the multivibrator 34 resets the counter 32. The number of times which the amplitude of a second electronic signature exceeds the threshold level 68 of FIG. 4 is then counted in this same manner. The second electronic signature need not be the next successive picture, but may be any subsequently occcurring picture selected by appropriate inhibiting circuitry within the skill of the art.

After the number related to the second electronic signature has been counted, the AND gate 38 is enabled for a short time prior to the transfer of the count in the counter 32 into the storage register 36 and prior to the resetting of the counter 32. During this time interval, the comparator 40 output signal is equal to the numerical difference between the number counted in the first electronic signature and the number counted in the second electronic signature. This numerical difference may be represented by a binary number with the $2^1$, $2^2$, $2^3$ and $2^4$ digital signals from the comparator 40, i.e. the signals taken from the true output terminals of the first four binary elements respectively, being applied to the respective switch contacts 42–48 to provide points at which levels representing the binary number may be sampled.

With the switch 50 in the position illustrated in FIG. 3, the $2^4$ signal from the comparator 40 is applied to the AND gate 38 together with the enabling signal from the multivibrator 28. If the numerical difference between the stored number and the number in the counter 32 is $2^4$ (16) or greater, i.e. if the difference exceeds 15, the binary $2^4$ signal applied to the switch contact 48 will assume a high signal level thereby providing an output signal at the output terminal of the AND gate 38. By changing the switch position so that the switch contact 46 is monitored, an output signal will be provided at the output terminal of the AND gate 38 when the numerical difference is equal to or exceeds $2^3$ (8). Various intermediate or higher numbers may be obtained by monitoring a greater number of comparator output signals and by utilizing standard logic circuits to convert from binary to decimal.

It can thus be seen that the automatic monitor 22 will provide an output signal whenever there is a preselected numerical difference between the number of times the amplitude of successive electronic signatures exceeds a predetermined thershold. It can be determined prior to placing the system in the automatic mode that an alarm indication is desired when the numerical difference exceeds 15, by way of example. This would be considered a significant enough change in picture content to warrant an alarm indication. The switch 50 may therefore be positioned to apply the binary $2^4$ output signal from the comparitor 40, i.e. the signal from the true output terminal of the fourth binary element, through the AND gate 38 to the alarm indicator 24 which may be conveniently of the latching relay type requiring a manual reset by security personnel.

In a given scene or optical image there may be 200,000 or more changes in the optical image content, resulting in a like manner of amplitude variations in the electronic signature thereof. However, a typical electronic signature may have only 20,000 detectable amplitude changes disregarding the synchronization and blanking signals. The threshold of the Schmitt trigger circuit 30 is preferably preset at a level which converts only about one fifth of these 20,000 amplitude changes into pulses for counting by the counter 32. Thus, about 4,000 pulses are generated and counted for each electronic signature applied to the Schmitt trigger circuit 30.

The size of the counter 32 and the storage register 36 may therefore be limited to about 12 digits, i.e. $2^0$, $2'$, . . . $2''$. In fact, since a significant optical change may be less than a numerical difference of one hundred, the storage register 36 and the comparitor 40 may have about a seven digit capacity.

To further reduce the required size of the counter 32 and the register 36, the counter 32 may be conventionally reset to a negative number approximately equal to the number of blanking pulses in an electronic signature. As is shown in waveform D of FIG. 4, a pulse is generated and counted for each blanking pulse in the electronic signature. This number (approximately 525) is equal for all electronic signatures and therefore may be eliminated from the count by this conventional negative resetting technique.

ADVANTAGES AND SCOPE OF THE INVENTION

It is apparent that the system of the present invention provides numerous advantages over prior art systems. For example, very little signal storage space is required since binary numbers related to only selected electronic signature amplitude changes need be stored, as opposed to storing the entire picture content.

Additionally, the entire signal processing system operates on a strictly numerical basis. Therefore, very little synchronization circuitry is required since the positions of the pulses of the digitized electronic signatures need not be determined.

Moreover, only significant scene changes result in an alarm indication thereby resulting in less chance of false alarms. This is particularly advantageous since the significance of scene changes represented by the determined numerical differences may be varied in accordance with existing conditions.

The present invention may thus be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for monitoring a predetermined field of view comprising the steps of:

a. generating successive electronic signatures of the field of view;

b. counting the number of times that the amplitude of each of the electronic signatures exceeds a predetermined threshold; and, c. comparing the number counted in one of said electronic signatures with the number counted in another of said electronic signatures.

2. The method of claim 1 including the step of indicating an alarm condition responsively to said comparison.

3. The method of claim 1 wherein the step of counting includes:

generating a pulse each time the amplitude of said electronic signatures exceeds said threshold;

counting the number of pulses generated for each of said electronic signatures; and, storing the number counted for one of said electronic signatures.

4. The method of claim 3 wherein the step of comparing comprises determining the difference between said stored number and the number counted in another of said electronic signatures.

5. The method of claim 4 including the step of indicating an alarm condition when said difference exceeds a predetermined number.

6. A method for monitoring a field of view comprising the steps of:

electronically scanning an entire optical image of a selected field of view at predetermined time intervals to generate analog video signals each related in amplitude to the light reflected from at least a portion of each entire optical image;

generating a pulse each time the amplitude of a video signal related to one entire optical image exceeds a predetermined threshold;

counting the number of pulses generated for said one entire optical image;

storing the number of pulses counted;

generating a pulse each time the amplitude of a video signal related to another entire optical image exceeds said threshold;

counting the number of pulses generated for said other entire optical image; and, comparing said stored number with said last counted number.

7. The method of claim 6 including the step of indicating an alarm condition responsively to said comparison.

8. Apparatus for monitoring a predetermined field of view comprising:

means for generating successive electronic signatures of said field of view;

means for counting the number of times that the amplitude of each of said electronic signatures exceeds a predetermined threshold; and, means for comparing the number counted in one of said electronic signatures with the number counted in another of said electronic signatures.

9. The apparatus of claim 8 including means for indicating an alarm condition in response to an inequality between said compared numbers.

10. The apparatus of claim 8 wherein said electronic signatures each comprise a composite video signal having an amplitude related to the light reflected from an optical image within said field of view and having scan synchronization signals superimposed thereon, and wherein said counting means comprises:

means for isolating at least a portion of said scan synchronization signals from said composite video signal;

means for generating a pulse each time the amplitude of said video signals exceeds a predetermined threshold;

means for counting the number of said generated pulses for said video signals; and, means responsive to said counting means and said isolating means for storing said counted number for one of said video signals.

11. The apparatus of claim 10 wherein said comparing means comprises:

means for generating a digital signal representative of the numerical difference between said stored number and the number of pulses counted for another of said electronic signals; and, means for generating an alarm signal when said digital signal exceeds a predetermined number.

12. The apparatus of claim 8 wherein said generating means comprises a television camera tube.

13. The apparatus of claim 12 wherein said counting means comprises:

means for generating a pulse each time the amplitude of said electronic signatures exceeds said threshold;

means for counting the number of pulses generated for each of said electronic signatures; and, means for storing the number of pulses counted for one of said electronic signatures.

14. The apparatus of claim 13 wherein said comparing means comprises means responsive to said counting means and said storing means for determining the difference between said stored number and the number of pulses counted for another of said electronic signatures.

15. The apparatus of claim 14 including means for generating an alarm signal when said difference exceeds a predetermined number.

16. In a surveillance system for monitoring unauthorized intrusion into a predetermined area, said system comprising television camera means for generating successive electronic signatures of a field of view which includes said area, means for supplying said successive electronic signatures to a remote security station, visual monitor means at said security station for providing a visual reproduction of said area responsively to said successive electronic signatures and automatic monitor means at said security station for automatically detecting unauthorized intrusion into said area, the improvement wherein said automatic monitor means comprises:

means responsive to each of said successive electronic signatures for generating an electrical pulse each time that the amplitude of said electronic signatures exceeds a predetermined threshold;

means for counting the number of generated electricl pulses;

means for storing the number of pulses counted in a first one of said successive electronic signatures;

means for comparing the stored number in said first one of said successive electronic signatures with the number of pulses subsequently counted in a second one of said electronic signatures;

means responsive to said comparing means for generating an alarm signal when a selected numerical difference between the numbers compared is exceeded.

* * * * *